(12) United States Patent
De Marchi

(10) Patent No.: US 6,562,280 B1
(45) Date of Patent: May 13, 2003

(54) METHOD AND APPARATUS FOR TRANSFERRING ORDERLY SEQUENCES OF BOTTLES MADE OF THERMOPLASTIC MATERIAL

(75) Inventor: Eligio De Marchi, Vittorio Veneto (IT)

(73) Assignee: Sipa S.p.A., Vento (IT)

( * ) Notice: Subject to any disclaimer, the term of this patent is extended or adjusted under 35 U.S.C. 154(b) by 0 days.

(21) Appl. No.: 09/555,052

(22) PCT Filed: Dec. 21, 1998

(86) PCT No.: PCT/EP98/08380

§ 371 (c)(1),
(2), (4) Date: May 24, 2000

(87) PCT Pub. No.: WO99/36337

PCT Pub. Date: Jul. 22, 1999

(30) Foreign Application Priority Data

Jan. 15, 1998 (IT) ......................................... PN98A0003

(51) Int. Cl.[7] .............................................. B29C 49/70
(52) U.S. Cl. ................. 264/523; 198/470.1; 198/482.1; 264/334; 425/215; 425/534; 425/537
(58) Field of Search ................................ 425/534, 537, 425/215; 264/334, 523; 406/86, 88; 198/470.1, 482.1, 485.1, 613

(56) References Cited

U.S. PATENT DOCUMENTS

| | | | | |
|---|---|---|---|---|
| 3,125,369 A | * | 3/1964 | Copping | 198/803.7 |
| 3,520,021 A | * | 7/1970 | Waechter et al. | 425/537 |
| 3,910,741 A | * | 10/1975 | Mehnert | 425/534 |
| 3,938,847 A | * | 2/1976 | Peyton | 198/470.1 |
| 4,025,261 A | * | 5/1977 | Rutkowski et al. | 425/537 |
| 4,059,188 A | * | 11/1977 | McDonald | 198/470.1 |
| 4,086,999 A | * | 5/1978 | McDonald | 425/534 |
| 4,215,967 A | * | 8/1980 | McGill et al. | 198/470.1 |
| 4,487,568 A | * | 12/1984 | Wiatt et al. | 425/534 |
| 4,572,355 A | * | 2/1986 | Hunter | 425/534 |
| 5,028,174 A | | 7/1991 | Karass | 406/88 |
| 5,232,717 A | * | 8/1993 | Voss | 425/534 |
| 5,299,889 A | * | 4/1994 | Langenbeck | 406/88 |
| 5,558,200 A | * | 9/1996 | Whitby et al. | 198/482.1 |
| 6,209,710 B1 | * | 4/2001 | Mueller et al. | 198/470.1 |
| 6,488,449 B1 | * | 12/2002 | Laquay et al. | 406/88 |

FOREIGN PATENT DOCUMENTS

| | | |
|---|---|---|
| EP | 0 596 487 | 5/1994 |
| EP | 0 768 165 | 4/1997 |

* cited by examiner

*Primary Examiner*—Robert Davis
(74) *Attorney, Agent, or Firm*—Wenderoth, Lind & Ponack, L.L.P.

(57) ABSTRACT

An apparatus for processing plastic hollow bodies has a blow-moulding station, a device for introducing thereinto a sequence of trains of preforms, an ejection station adapted to separate the ejected hollow bodies, and devices provided downstream of the ejection station to handle the hollow bodies, the devices including a conveyor belt capable of being driven by a pulley and provided with plugs adapted to pick up the hollow bodies. The pulley is provided on its outer surface with a plurality of ejectors that are arranged to sequentially engage and disengage the pick-up plugs so as to release the blow-moulded hollow bodies therefrom. Beneath said ejectors there is arranged a guide which is adapted to intercept the so released hollow bodies, and which is provided with two parallel rails adapted to retain the hollow bodies by their neck portion and push them, preferably with jets of blown air, towards their utilization apparatuses.

10 Claims, 5 Drawing Sheets

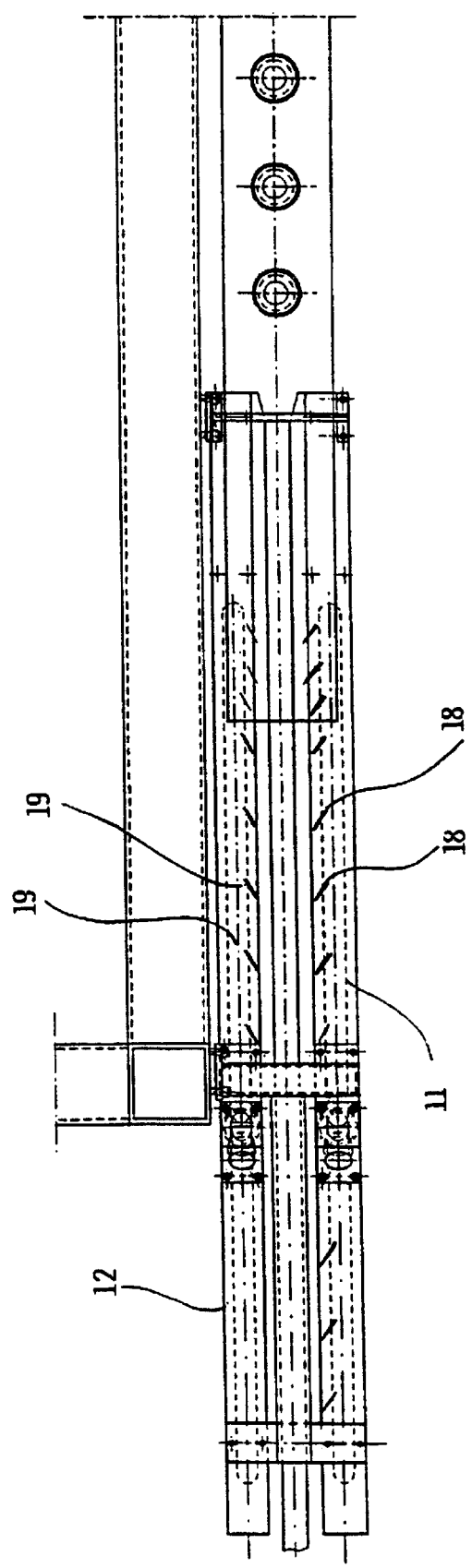

METHOD AND APPARATUS FOR TRANSFERRING ORDERLY SEQUENCES OF BOTTLES MADE OF THERMOPLASTIC MATERIAL

DESCRIPTION

The present invention refers to an improved apparatus for handling on a large-scale basis, and in an orderly sequential manner, containers made of thermoplastic material, in particular polyethylene terephtalate (PET) and polypropylene (PP), by submitting appropriate semi-finished moulded parts generally known as "parisons" or "preforms" to a so-called blow-moulding process.

In particular, the present invention can be used in a most advantageous manner when the described apparatus is associated to a preform production plant, i.e., a plant that is also known as a single-stage one, but can, of course, be effectively used also in connection with plants that are fed with previously produced preforms to only carry out the final blow-moulding phase (two-stage plants).

As a matter of fact, these processes for the production of the above cited kinds of containers are generally known to be able to be schematically divided into two basic topologies, single-stage and two-stage processes.

In two-stage processes, a previously moulded preform or parison in a substantially amorphous state is heated up again to its preferred molecular orientation temperature, at which it is then blow-moulded to the desired shape. As used in this particular context, the term "two-stage process", or simply "two-stage", is intended to mean any process that produces a preform or parison which must subsequently be heated up again from room temperature to the respective blow-moulding temperature.

On the contrary, single-stage processes are so defined owing to the fact that they are capable of moulding the so-called preform or parison, and transferring the same preform or parison from the injection or extrusion mould (after it has cooled down to some appropriate temperature) to a conditioning station where the preform or parison is allowed to evenly balance down to a preferred molecular orientation temperature. The preform or parison is then transferred to a blow-moulding mould, where it is moulded to the desired shape.

The state of the art concerning the techniques implemented for solving the various problems in connection with the processes of injection-moulding or extrusion and blow-moulding of the preforms, as well as the synchronization of all these processes with each other in view of increasing the productivity of the whole production plant, is exhaustively described in the European patent application EP 0 768 165, filed by the same Applicant, which also describes the most significant patent literature existing on the matter and to which reference should therefore be made.

Both above cited types of production methods involve the use of a (per sè known) blow-moulding station and the therewith associated handling means for transferring and releasing the preforms and/or the blow-moulded containers after the blow-moulding phase.

Largely known in the art are also the problems connected to the start-up of a single-stage plant. In particular, when such plants are being started, the need arises technically for the plant to be brought to steady-state conditions, which means the need for the blow-moulding moulds, and in particular the injection moulds in the stage where the preforms are extruded/injection-moulded, to be brought to a pre-determined temperature, before preforms with the desired properties can be obtained.

As a result, after the plant has been started, a certain quantity of preforms are unavoidably produced for a certain period of time, or number of cycles, which, owing to the preforms not yet having the desired properties, cannot be used and must therefore be discarded.

To this purpose, such a type of plant is therefore started initially so that only the section thereof devoted to the production of preforms is actually operated, wherein the preforms, after having been removed from the moulds, are handled and transferred in the usual manner, and are eventually moved across the blow-moulding station. Since such preforms are not yet capable to be used for blow forming, owing to the above cited reasons, the blow-moulding station is not yet operating and, as a consequence, the preforms move, without being actually processed, between the two blow-forming mould halves which remain in their open position.

When they move out of the mould halves, the preforms, which are usually organized in groups that move in a synchronized manner, otherwise known as "preform trains" in the art, are transported, with generally per sè known means, towards an ejection station where they are separated from the plant and usually discharged into appropriate bins or containers. Anyway, they are eliminated from the production process.

After a certain period of initial operation, the plant then reaches steady-state conditions, so that it can from then on be operated in all of its sections.

As a consequence, the blow-moulding station is then running, so that the preforms are blow formed there and converted into finished containers which are again transported, in the same manner as illustrated above, to the ejection station that discharges them into appropriate baskets, bins or similar containers adapted to collect the finished product, from which they are then brought to the utilization plants, which are usually the filling plants.

Therefore, it clearly emerges that the need for two groups of products to be separated, i.e., the preforms or the blow-formed containers that are produced during the two subsequent phases of operation under start-up and steady-state conditions of the plant, practically involves the need for a phase to be provided of selective separation from the plant and, therefore, also of selective separation of the containers that are blow-moulded after the steady-state conditions of the plant have been reached.

It clearly ensues that such a need for a selective separation phase to be included and operating even after the plant has reached steady-state conditions, causes the orderly and substantially continuous flow of containers from the blow-moulding station to the utilization plants thereof to be practically interrupted. As a result, such a separation phase generates a considerable diseconomy since it practically prevents the production flow of blow-moulded containers from being automatically synchronized with the utilization flow of the same containers in the plants, such as filling plants, provided downstream.

As far as two-stage plants are concerned, i.e., practically the preform temperature conditioning station and the blow-moulding station, the situation is substantially similar to the one that has been just described with reference to single-stage plants, owing to a persisting need for a start-up phase to be provided in order to bring all of the various sections of the plant up to steady-state temperature.

Also in connection with two-stage plants, therefore, the need still arises for an initial run of preforms to be produced, which must then be "discarded" and separated selectively from the plant, so that the same drawbacks and diseconomies as the aforementioned ones are encountered also in these kind of plants.

Therefore, the need arises of providing an apparatus able to sequencially carry a plurality of containers and to release them in a transfer means apt to engage them and to move them from a specific working station to a different one. From EP 0 596 487 a transfer means of containers is known that is mainly using a moving chain operated in a closed loop. However, such a means appears to be rather complicated and burdensome both in the construction and during operation. Furthermore, it is missing of automatic means of expulsion, collecting and transfering of the containers as they reach a specific working station.

SUMMARY OF THE INVENTION

In consideration of what has been stated above, it is therefore a man purpose of the present invention to provide an apparatus and a method applying to the phases that follow the actual blow-moulding phase of a plant for the production of blow-moulded containers, so as to eliminate all of the above cited drawbacks and enable such the plant to feed in a substantially continuous and automatic manner the utilization plants arranged downstream, without any interposition of phases that are non-automatic or such as to anyway cause the continuity of flow of blow-moulded containers feeding such utilization plants to be interrupted. Furthermore, such an apparatus must be easily implemented through the use of readily available techniques and, therefore, be a reasonably low-cost one.

Such a main aim of the present invention, along with further features thereof, is reached in an apparatus that is made and operates as recited in the appended claims.

BRIEF DESCRIPTION OF THE DRAWINGS

The present invention may take the form of a preferred embodiment such as the one that is described in detail below by way of non-limiting example with reference to the accompany drawings, in which:

FIG. 2 is a view along a section of FIG. 1;

DETAILED DESCRIPTION OF THE INVENTION

The basic novelty of the present invention lies in the use of particular methods and means for releasing and separating the blow-moulded containers from a conveyor belt to which they are applied by means of appropriate devices that are generally known in the art as "pick-up plugs".

The release means, along with the thereto associated means for routing the blow-moulded, finished containers towards the utilization lines thereof, are arranged downstream of the traditional ejection stations which in turn are provided downstream of the blow-moulding stations.

Figure 1:
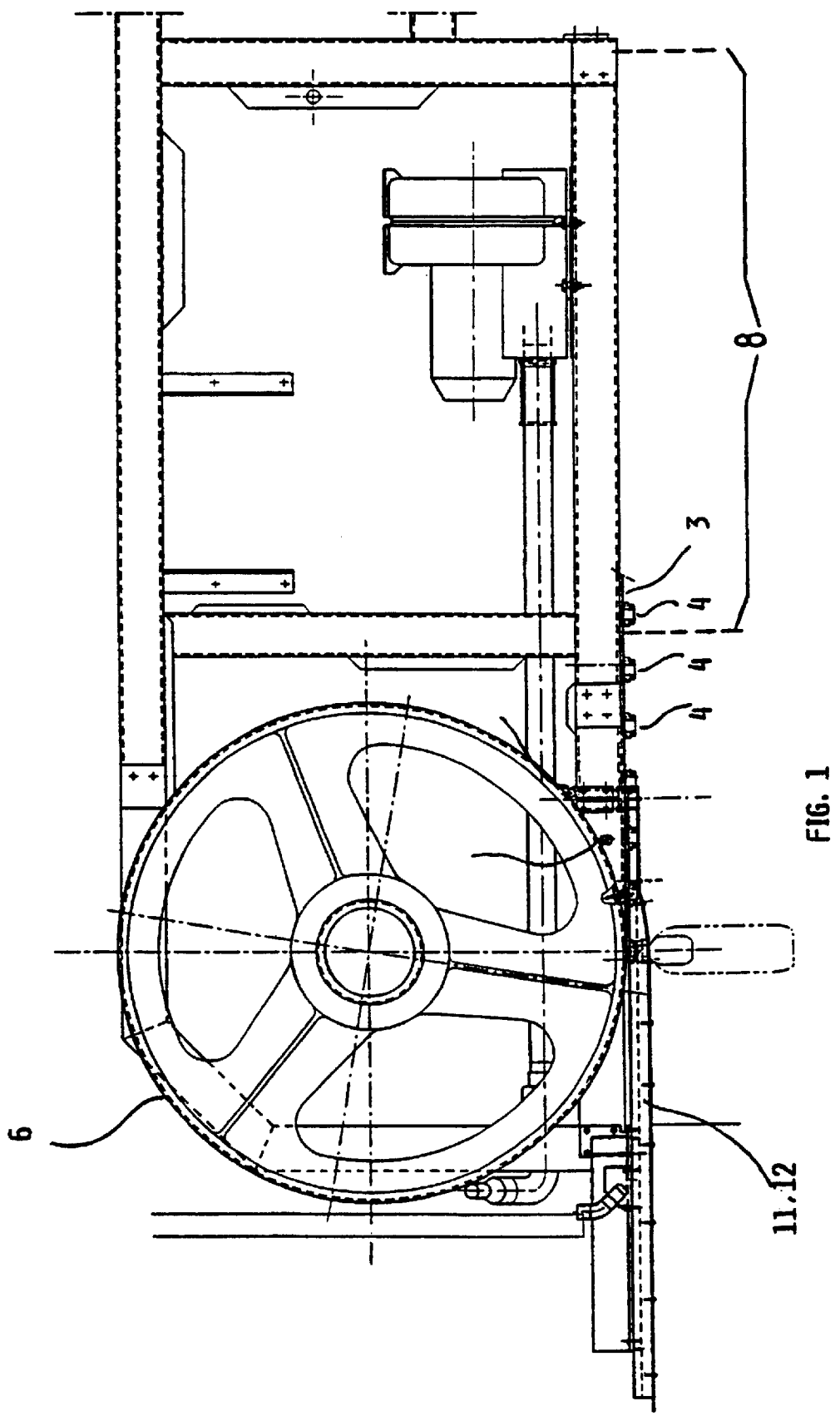
FIG. 1 is a vertical side view of an apparatus according to the present invention.

Referring now to FIG. 1, which is a schematical view of a traditional blow-moulding plant with associated finished-container ejection station, the same plant can be noticed to include a blow-moulding station 1 (which is shown here only symbolically), a conveyor belt 3 adapted to feed the blow-moulding station 1 with synchronized groups or trains of preforms and provided with a plurality of pick-up plugs 4 adapted to engage the necks 5 of respective preforms to transport them along the direction of movement of the conveyor belt 3, and a wheel 6 acting as a driving pulley for the conveyor belt 3.

Downstream of the blow-moulding station 1 there is arranged a part ejection station 1, of a per sè known type and therefore only shown here as generally indicated at 8, which is provided with means adapted to separate in a synchronized manner the various successive trains of preforms or blow-moulded containers from the related pick-up plugs provided on the conveyor belt 3.

Once such a separation has so taken place, the preforms or blow-moulded containers fall by gravity into appropriate bins or similar containers (not shown) that are then sent to appropriate utilization lines (or recovery/recycling lines in the case of rejects).

As has already been pointed out earlier in this description, non-blown preforms are produced during the plant start-up period before steady-state conditions are reached and, after the steady-state conditions are eventually reached, blow-moulded containers are produced that are ready for further use, i.e., usually for filling.

The present invention provides the kind of plant with means which, when arranged downstream of the ejection station 8, are capable of separating solely the blow-moulded containers from the conveyor belt 3, as well as transferring the same containers, in an orderly sequence and at a continuous, constant rate, onto a special transport line adapted to route the containers towards their final utilization, i.e., filling apparatuses.

It clearly emerges that, if the means are arranged downstream of the ejection station 8, the latter must be provided with selectively actuatable devices adapted not to eject, but rather to retain the blow-moulded containers in order to enable such containers to travel on until they reach the zone where they are orderly separated therefrom and sent in a continuous manner to the transport line for conveyance towards the utilization apparatuses.

The actuation means shall of course be such as to also enable non-blown preforms to be ejected during the plant start-up period before steady-state conditions are reached.

Figure 4:
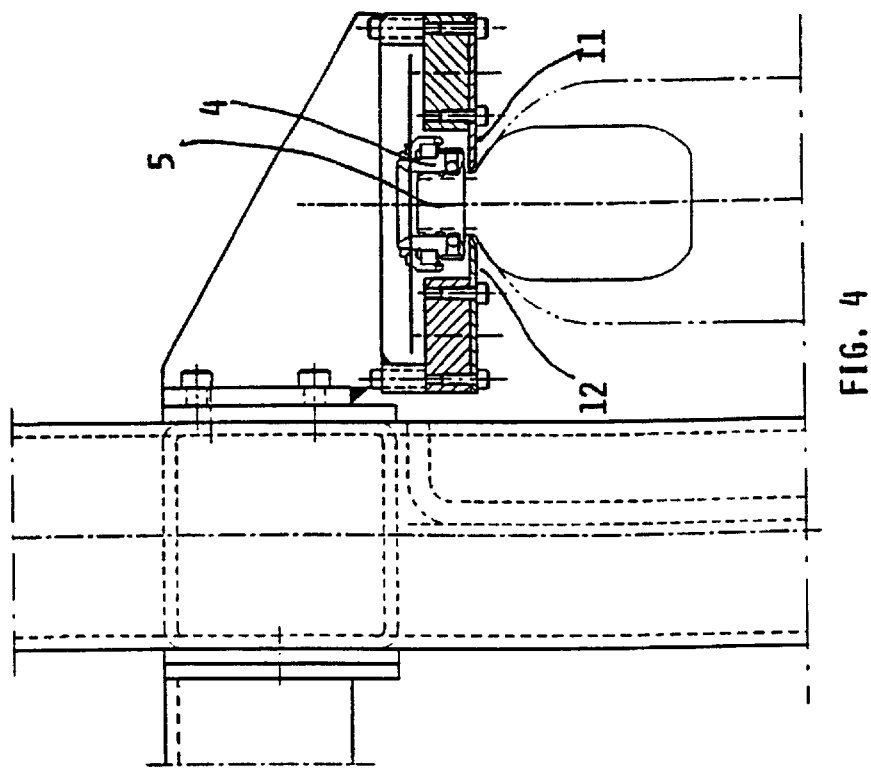
FIGS. 3 and 4 are views along sections of FIG. 1.
Figure 6:
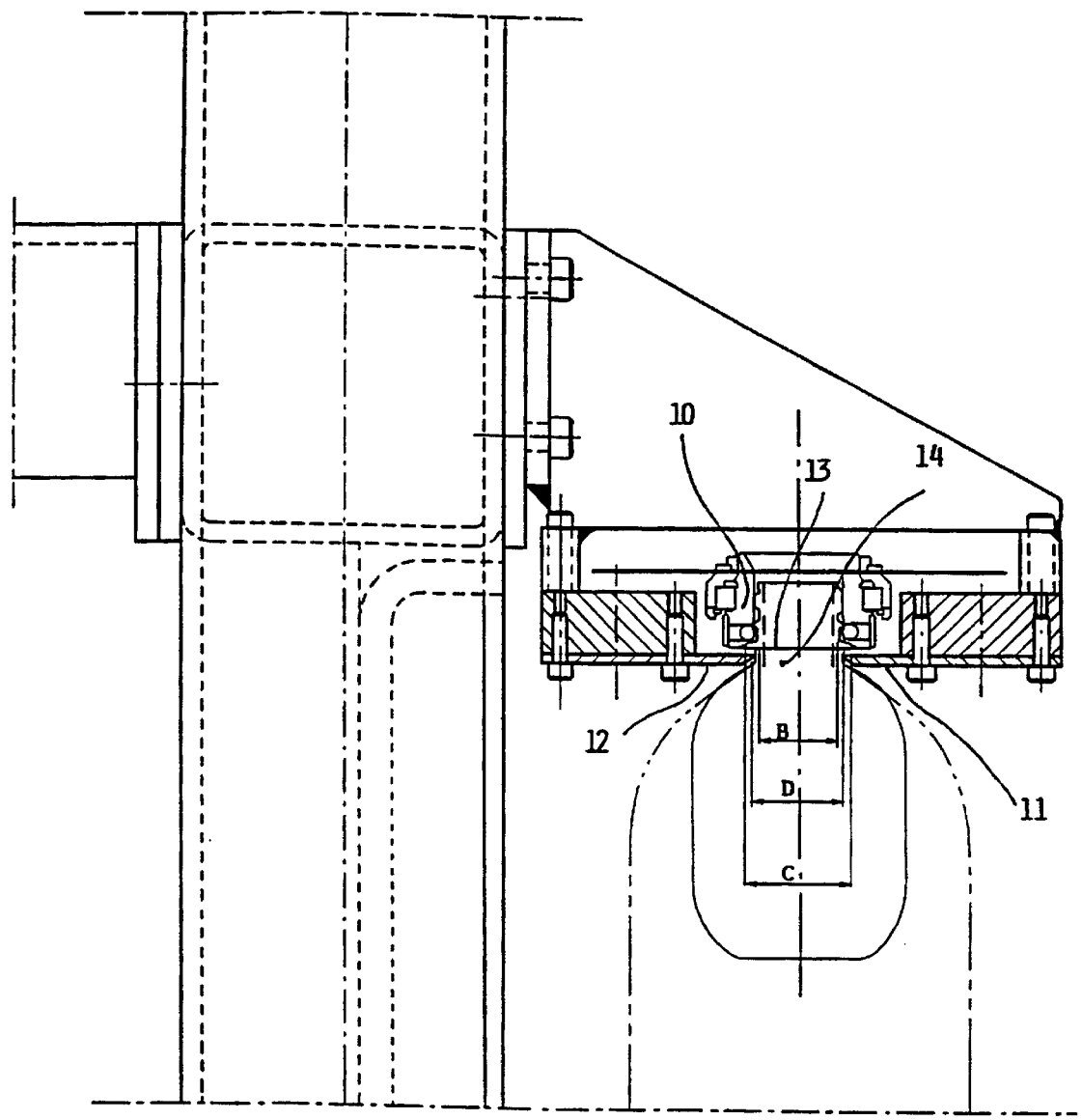
FIG. 6 is an enlarged view of a detail of FIG. 4.

With reference to the Figures, the means arranged downstream of the ejection station 8 can be noticed to include:

a wheel 6 acting as a driving pulley and provided with ejection elements 10 adapted to successively engage and disengage inside the pick-up plugs 4 so as to eject the blow-moulded hollow bodies that are applied thereto; and a guide comprising two rails 11 and 12 arranged at a distance D that is slightly smaller than a diameter C of a neck 13 of the hollow bodies, but larger that a diameter B of a blown portion 14 of the hollow body situated immediately beneath the respective neck portion, as illustrated in FIG. 6; from the illustration in FIG. 4, it can be noticed that the guide is arranged in a substantially horizontal position and is aligned with the vertical projection of the conveyor belt 3 and the pulley 6.

At the side of the rails, and parallel with respect thereto, there are provided respective hollow conduits 16, 17 which are provided with a plurality of slits 18 and 19, respectively, facing the interior of the guide at the same height as the one at which the necks of the hollow bodies come to situate themselves; the slits are aligned according to and oriented in the direction of movement of the blow-moulded hollow bodies.

The hollow conduits are connected, via appropriate conduits 20, to air-flow generators (blowers) adapted to generate such air flows at an appropriate rate and pressure.

Figure 3:
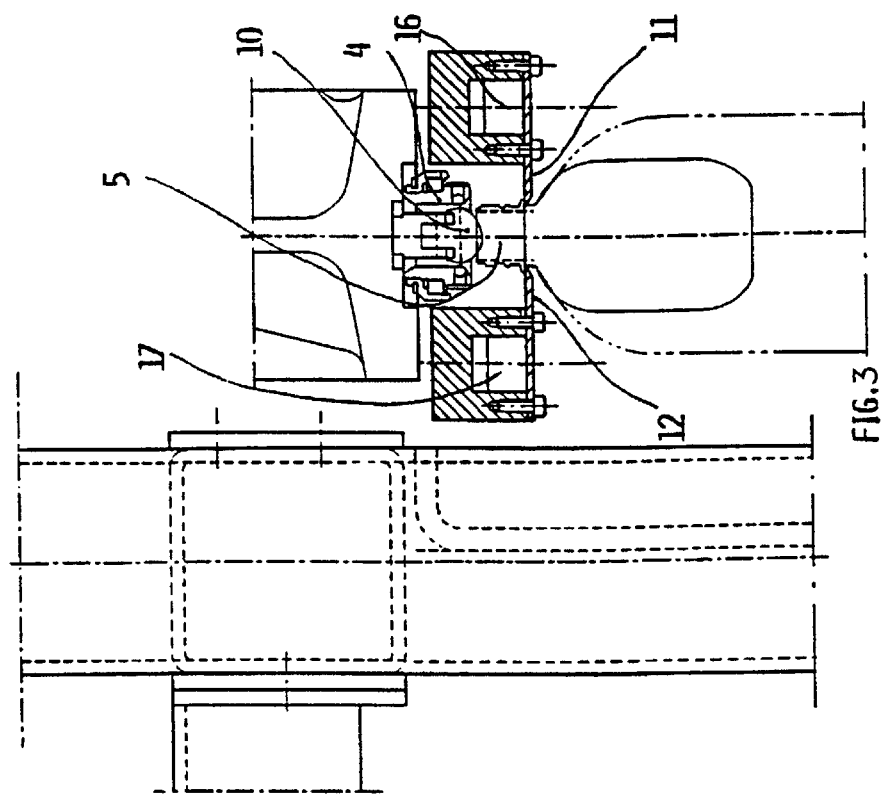
Figure 5:
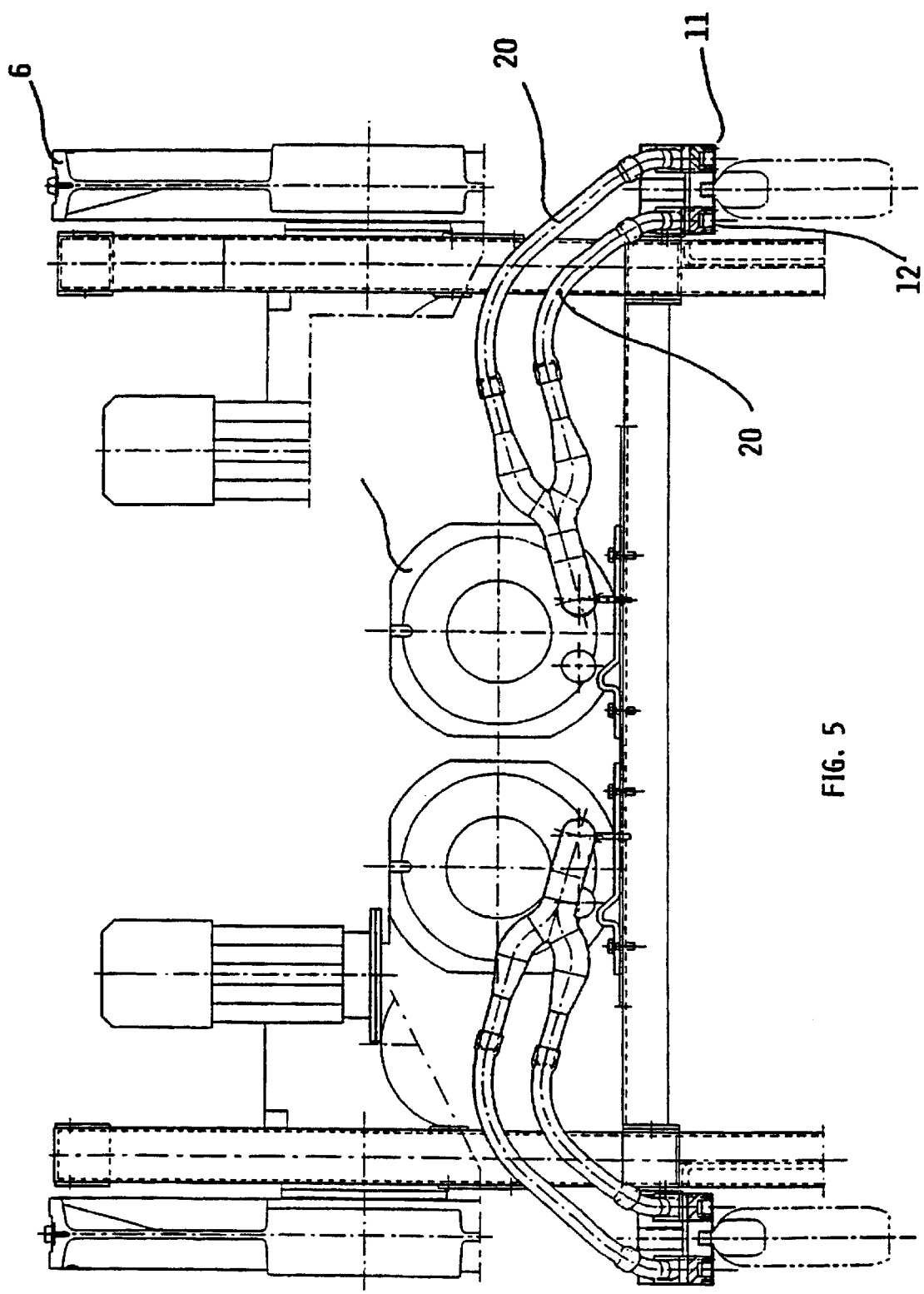
FIG. 5 is a view along another section of FIG. 1.

The operations of the above cited means is as follows:

As best shown in FIGS. 1, 2 and 3, the pick-up plugs 4 are caused to move forwards by the conveyor belt 3 until they reach a position in which the respective necks 13 engage with their upper portion the rails 11 and 12 (FIG. 4) without actually touching them. As they move further on along their travel path, respective ejection elements 10 provided on the outer side of the pulley 6 penetrate the interior of the pick-up plugs 4 and push off the respective hollow bodies therefrom, as this is best shown in FIG. 3.

Since they are no longer supported by the respective pick-up plugs 4, the blow-moulded bodies tend to fall, but are immediately retained by their respective neck portion by the rails 11 and 12.

The physical arrangement of the various above described elements is such that the position in which the pick-up plugs 4 enter the rails comes before the position in which the ejection elements 10 engage the necks of the respective hollow bodies, so that all of the hollow bodies are separate in a sequence from the respective pick-up plugs 4 and sent, again in a sequence, along the guide.

After the hollow bodies are so ejected by the respective ejection means and then so retained by the rails, the movement thereof along the rails may be ensured by any of a plurality of means, provided that these are adapted to automatically and sequentially transport the hollow bodies towards their utilization plants, wherein the means may be driven in any of various known methods, e.g., electrically, mechanically, pneumatically or the like.

In a preferred manner, according to an improved embodiment of the present invention the means are based on an air jet that, owing to its being suitably oriented and coming from the plurality of subsequent slits 18 and 19 provided along the travel path of the hollow bodies, takes the form of an air jet blowing in a substantially continuous manner onto the various necks 5 of the hollow bodies and so pushes them in an orderly manner along the rails up to the utilization plants.

Although the invention has been described here based on the example of preferred embodiments thereof and using a generally known terminology, it shall not be intended as being limited thereby, since it is well within the ability of anyone skilled in the art to develop a number of variants from the teachings thereof. The appended claims shall therefore be understood as covering all such possible obvious modifications that are within the ability of those skilled in the art and do not depart from the actual scope of the present invention.

What is claimed is:

1. An apparatus for processing hollow bodies of plastic material, which may be both blow-moulded containers and not yet blow-moulded preforms, and transferring said hollow bodies into collecting means or towards utilization lines, comprising at least a blow-moulding station, means arranged downstream of said blow-moulding station, and including:

an ejection station adapted to separate said hollow bodies removed from or coming out of said blow-moulding station and corresponding to trains of the preforms that are fed in a sequence to said blow-moulding station, and means that are arranged downstream of said ejection station for handling said hollow bodies, these means comprising a conveyor belt adapted to be driven by a pulley and provided with members or pick-up plugs for picking up and releasing said hollow bodies, a pulley arranged vertically and adapted to drive said conveyor belt, separation and transfer means downstream of said ejection station adapted to separate said hollow bodies from the respective pick-up plugs in the form of blow-moulded containers and send them in a substantially continuous sequence towards their utilization apparatuses, characterized in that:

said separation means comprise said pulley which is provided on its outer surface with a plurality of ejecting elements arranged at a pre-established distance and adapted to orderly and sequentially engage interiors of said pick-up plugs so as to separate said blow-moulded hollow bodies therefrom, and beneath said ejecting elements there is arranged a guide that is adapted to intercept and retain said so separated blow-moulded hollow bodies, said guide comprising two parallel rails.

2. An apparatus according to claim 1, characterized in that said handling means comprise two hollow conduits, which are aligned along said two respective rails and in which there is provided a respective plurality of slits facing an interior of the respective rail and oriented in a direction of movement of the blow-moulded hollow bodies.

3. An apparatus according to claim 2, characterized in that said hollow conduits are connected to one or more blowing means generating an air flow that is conveyed into said conduits.

4. An apparatus according to claim 3, characterized in that air-flow pressure, distance, width and orientation of the slits, as well as a configuration of the rails are adapted to enable said blow-moulded hollow bodies to be pushed in an orderly sequence towards their utilization apparatuses.

5. An apparatus according to claim 1, characterized in that it is provided with means for actuating and controlling an operation of said blow-moulding station and said ejection station in such a manner as to selectively bring about following operational modes:

blow-moulding station non-operating, ejection station operating; and blow-moulding station operating, ejection station non-operating, under actuation of said air-flow generating means.

6. A method for producing and transferring hollow blow-moulded plastic bodies, comprising the phases of:

blow moulding said plastic bodies, sequentially and orderly separating said plastic bodies from a conveyor belt at a predetermined rate, said conveyor belt being activated by at least a pulley provided with pick-up plugs for picking up and releasing said hollow bodies, placing said hollow bodies in an orderly row along a transfer means able to support and guide them by means of a pair of rails that are adapted to retain said hollow bodies by their respective neck portion, transferring said plastic bodies to their respective apparatuses, characterized in that:

the separation of said plastic bodies from said conveyor belt is carried out by pushing with a plurality of ejecting elements, arranged on an outer surface of said pulley, an interior of said plugs as to separate said hollow bodies therefrom, after being separated from said conveyor, said hollow bodies are caused to move along by a plurality of air jets blown at an appropriate angle that is preferably symmetrical with respect to their movement direction.

7. A method according to claim 6, characterized in that said hollow bodies, so arranged in said pair of supporting rails, are caused to move along by the plurality of air jets blown at the appropriate angle that is preferably symmetrical with respect to the direction of movement of said hollow bodies.

8. An apparatus according to claim 2, characterized in that it is provided with means for actuating and controlling an operation of said blow-moulding station and said ejection station in such a manner as to selectively bring about following operational modes:

blow-moulding station non-operating, ejection station operating; and blow-moulding station operating, ejection station non-operating, under actuation of said air-flow generating means.

9. An apparatus according to claim 3, characterized in that it is provided with means for actuating and controlling an operation of said blow-moulding station and said ejection station in such a manner as to selectively bring about following operational modes:

blow-moulding station non-operating, ejection station operating; and blow-moulding station operating, ejection station non-operating, under actuation of said air-flow generating means.

10. An apparatus according to claim 4, characterized in that it is provided with means for actuating and controlling an operation of said blow-moulding station and said ejection station in such a manner as to selectively bring about following operational modes:

blow-moulding station non-operating, ejection station operating; and blow-moulding station operating, ejection station non-operating, under actuation of said air-flow generating means.

* * * * *